United States Patent
Barcelona

(10) Patent No.: US 7,126,521 B2
(45) Date of Patent: Oct. 24, 2006

(54) TWO-DIMENSION DIGITAL RATIOMETRIC DECODER

(75) Inventor: Paul Barcelona, Hampstead, MD (US)

(73) Assignee: Honeywell International Inc., Morrisville, NJ (US)

(*) Notice: Subject to any disclaimer, the term of this patent is extended or adjusted under 35 U.S.C. 154(b) by 244 days.

(21) Appl. No.: 10/858,950

(22) Filed: Jun. 2, 2004

(65) Prior Publication Data
US 2005/0270211 A1 Dec. 8, 2005

(51) Int. Cl.
*H03M 1/12* (2006.01)
(52) U.S. Cl. .................. 341/155; 341/132; 324/207.13; 324/207.18
(58) Field of Classification Search ........... 324/207.13, 324/207.18; 341/132, 155
See application file for complete search history.

(56) References Cited

U.S. PATENT DOCUMENTS

| | | | |
|---|---|---|---|
| 4,678,991 A | 7/1987 | Schmidt | |
| 4,982,156 A | 1/1991 | Lewis et al. | |
| 5,194,865 A * | 3/1993 | Mason et al. | ................ 341/132 |
| 6,359,578 B1 * | 3/2002 | Gee et al. | .................... 341/155 |

* cited by examiner

*Primary Examiner*—Rexford Barnie
*Assistant Examiner*—Khai M. Nguyen
(74) *Attorney, Agent, or Firm*—Fogg and Associates, LLC; Scott V. Lundberg

(57) ABSTRACT

A two-dimensional all-digital ratiometric decoder to analyze signals representative of state changes in a closed loop control system. In one embodiment, the two-dimensional digital ratiometric decoder comprises at least one selector circuit, a summation circuit, a difference circuit and a divider circuit. The at least one selector circuit is adapted to select the signals to be processed by alternating between the signals representative of the X dimension and the signals representative of the Y dimension. The summation circuit is adapted to add the amplitude magnitudes of the signals selected. The difference circuit is adapted to obtain the difference between the amplitude magnitudes of the signals selected. The divider circuit is adapted to divide the output of the difference circuit by the output of the summation circuit to produce a quotient proportional to the physical change of the object being controlled.

63 Claims, 4 Drawing Sheets

TWO-DIMENSION DIGITAL RATIOMETRIC DECODER

TECHNICAL FIELD

The present invention relates generally to closed loop control systems and in particular the present invention relates to a two-dimensional all-digital ratiometric decoder to analyze signals representative of state changes in a closed loop control system.

BACKGROUND

A closed loop control system is the basic method employed to automate control of a system. One example of such a system is a servo control system which is a closed loop control of position and velocity. In order for such a system to work it must know where it is located at any given point in time. One method for achieving this requirement is by using a sensor to detect changes in movement. This can be accomplished by using different types of sensors. One such sensor is a linear voltage differential transducer (LVDT). An LVDT is a displacement transducer widely used to measure changes in the physical state of a system (i.e. fluid level, pressure, temperature, etc.). An LVDT has many applications such as sensing fluid levels, temperature, force, pressure, position and velocity among many others. LVDTs have gained wide use because their sensing elements have no actual physical contact when sensing. Therefore, there is very little wear on the LVDT while in use. A typical LVDT consists of a primary coil driven by an alternating current (AC) source, two secondary coils and a movable magnetic core. When the core is centered, the magnitude of the differential AC voltage output induced in the secondary coils will be the same in each coil. This state represents the zero or center point of the physical state being measured. When the core is displaced, the voltage across the secondary coils will change. This state represents a change or displacement in the physical state being measured.

In a typical application with instrumentation, the voltage output from the secondary coils of an LVDT must be rectified to a direct current (DC) signal. The DC signal is then typically processed by analog circuits to produce a voltage output which is linearly proportional to the displacement of the core and consequently the change in the physical state. This voltage output is then typically passed through an analog to digital converter in order to be used with today's computerized control systems.

Typical analog circuits used with LVDTs suffer from important limitations, however. They are subject to component drift and the output is temperature dependent. Some analog circuits use wiring known as ratiometric wiring which makes them more temperature independent. However, these require that the calculated sum of the input signals be constant to minimize errors. If the sum is not constant, high non-linearities in the processed signal can result. Additionally, current analog circuits only process signals for one dimension.

For the reasons stated above and for other reasons stated below which will become apparent to those skilled in the art upon reading and understanding the present specification, there is a need in the art for a decoder which will perform the function of the analog circuits used with LVDTs, but is not subject to the limitations of analog circuits used with LVDTs and can function in more than one dimension.

SUMMARY

The above mentioned problems with LVDT analog circuitry and other problems are addressed by the present invention and will be understood by reading and studying the following specification.

In one embodiment, a closed loop control system is disclosed. The closed loop control system comprises one or more analog-to-digital converters, a two-dimensional digital ratiometric decoder, and a control unit. The one or more analog-to-digital converters are adapted to convert analog signals representative of a change in X and Y dimensions into digital signals. The two-dimensional digital ratiometric decoder is adapted to process the digital signals into a digital value representative of a position offset with respect to a center point. The control unit is adapted to process an output of the two-dimensional digital ratiometric decoder.

In another embodiment, a method for processing digital signals, such that the resultant digital signal is proportional to a physical change detected in a closed loop control system, is disclosed. The method comprises adding two digital signals for one dimension to produce a sum of the signals' magnitudes, subtracting one of the signals from the other to produce a difference of the signals' magnitudes, and dividing the difference of the signals' magnitudes by the sum of the signals' magnitudes to produce a quotient which is proportional to the physical change of the object being controlled.

In another embodiment, a two-dimensional digital ratiometric decoder is disclosed. The two-dimensional digital ratiometric decoder comprises at least one selector circuit, a summation circuit, a difference circuit and a divider circuit. The at least one selector circuit is adapted to select the signals to be processed by alternating between the signals representative of the X dimension and the signals representative of the Y dimension. The summation circuit is adapted to add the amplitude magnitudes of the signals selected by the selector circuit. The difference circuit is adapted to obtain the difference between the amplitude magnitudes of the signals selected by the selector circuit. The divider circuit is adapted to divide the output of the difference circuit by the output of the summation circuit to produce a quotient proportional to the physical change of the object being controlled.

In another embodiment, a method for responding to a physical change in a closed loop control system is disclosed. The method comprises converting analog signals representative of a physical change in more than one dimension to digital signals, processing the digital signals with a two-dimensional digital ratiometric decoder to produce a digital quotient which is proportional to the physical change measured, and processing the digital quotient to determine the appropriate response to the physical change measured.

BRIEF DESCRIPTION OF THE DRAWINGS

The present invention can be more easily understood and further advantages and uses thereof more readily apparent, when considered in view of the description of the preferred embodiments and the following figures in which.

DETAILED DESCRIPTION

In the following detailed description of the preferred embodiments, reference is made to the accompanying drawings, which form a part hereof, and in which are shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
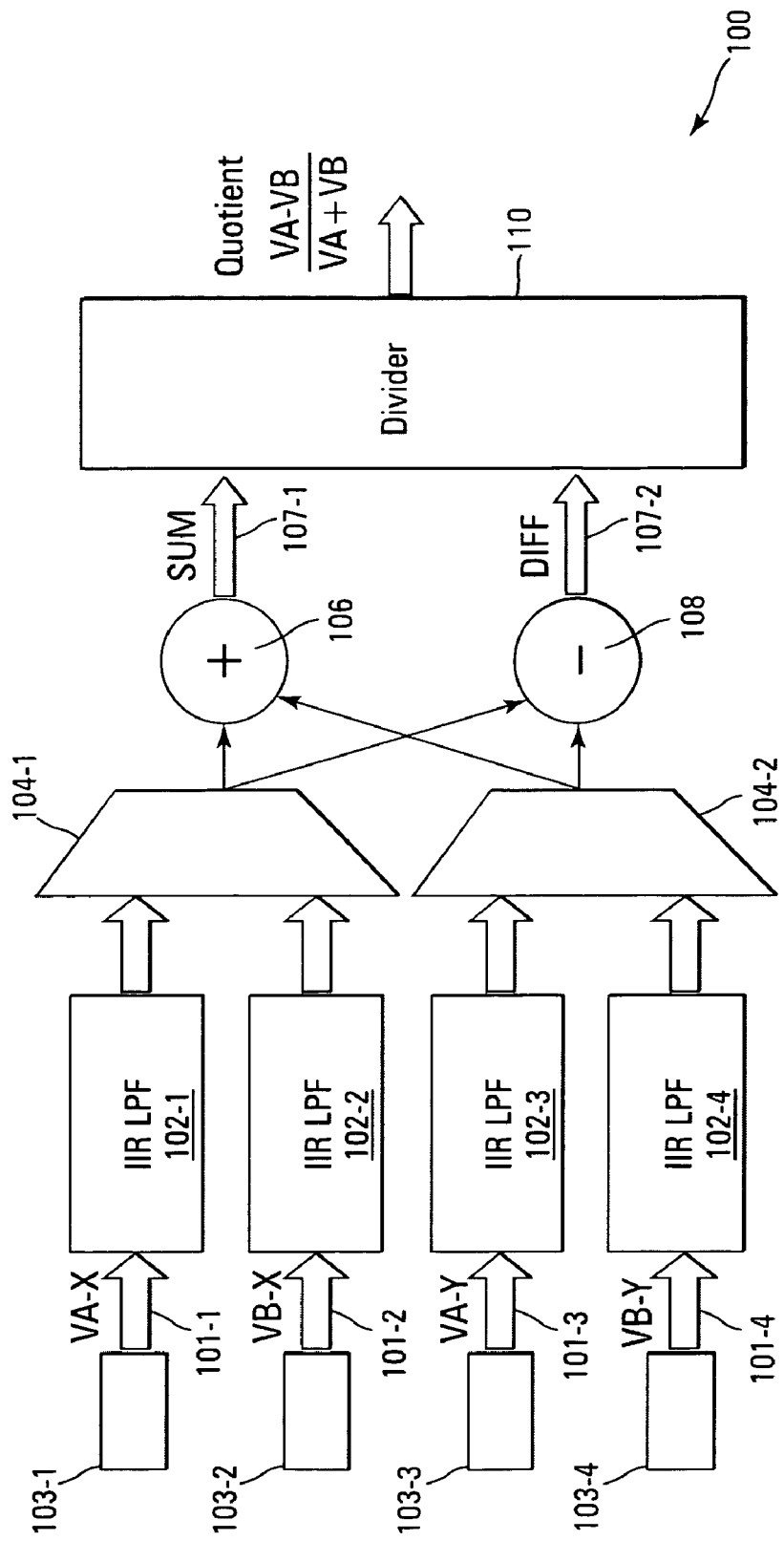
FIG. 1 is a block diagram of one embodiment of a two-dimension digital ratiometric decoder constructed according to the teachings of the present invention.

An embodiment of a two-dimensional digital ratiometric decoder 100 of the present invention is illustrated in FIG. 1. In this embodiment, four analog AC signals are digitized using analog-to-digital converters (not shown). The decoder first synchronously rectifies the signals in rectifiers 103-1 through 103-4. For each dimension there are two signals whose envelope amplitudes are directly proportional to a position offset with respect to a predefined center point. The position offset represents a change in the physical position being measured, i.e. a change in the X or Y dimensions. For convenience sake, the signals appear in FIG. 1 as VA-X 101-1, VB-X 101-2, VA-Y 101-3, and VB-Y 101-4. Those ending in X represent the X dimension and those ending with Y represent the Y dimension.

In this embodiment, the signals are over-sampled 16-bit digitized amplitude modulated (AM) signals. The four digitized signals 101-1 through 101-4 are passed into corresponding low pass filters (LPF) 102-1 through 102-4 in order to smooth out the signal and reduce noise. In this embodiment, the LPFs (102-1 through 102-4) are two-pole infinite impulse response (IIR) LPFs with programmable coefficients. The waveforms which are output by the filter will necessarily change with a change in the programmable coefficients. However, the final output quotient of the two-dimensional digital ratiometric decoder will remain unchanged despite a change in the filter coefficients. In this embodiment, the coefficient for decimation of the signals is set to 18. Additionally, in this embodiment, the IIR LPFs (102-1 through 102-4) are implemented using a bit-serial approach. This allows a larger level of integration since the main computing elements, multipliers and adders, consume significantly less area than their parallel counterparts. Performing these functions in a parallel architecture would consume 20 times more area.

After passing through the filters, selector circuits 104-1 and 104-2 select which dimension will be processed (i.e. the X or Y dimension). The selector circuits in this embodiment are 2-to-1 multiplexors. Both dimensions are processed essentially simultaneously in a time share fashion by the selector circuits 104-1 through 104-2. Once the signals for a particular dimension are selected, the signals are added in a summation circuit 106 and subtracted in a difference circuit 108 to produce a sum and difference of the two signals for that dimension. The difference is calculated as VA-VB for each dimension. The sum and difference signals 107-1 and 107-2 are then passed into a divider circuit 110 to calculate a 16-bit quotient of the difference divided by the sum. This quotient (which is representative of a position with respect to a center point) is then passed back to a control system. The control system then moves the object being controlled based on the information received from the two-dimensional digital ratiometric decoder. Circuits used in this embodiment for selecting, summing, subtracting and dividing are made of standard digital logic functions known to one skilled in the art.

The architecture of the two-dimensional digital ratiometric decoder is flexible and can be easily changed to satisfy a wide range of applications. For example, while the present invention has the advantage of operating in two dimensions, it also has the ability to function in only one dimension if so desired. This could be accomplished if the signal which controls the second dimension is static. Additionally, this functionality could be easily programmed into the two-dimensional digital ratiometric decoder although it is not in the above embodiment. Finally, while this design is initially targeted toward a field programmable gate array (FPGA), it could be easily migrated to a mixed-signal application specific integrated circuit (ASIC) where the ADC converters are integrated with the signal-processing core.

Figure 2:
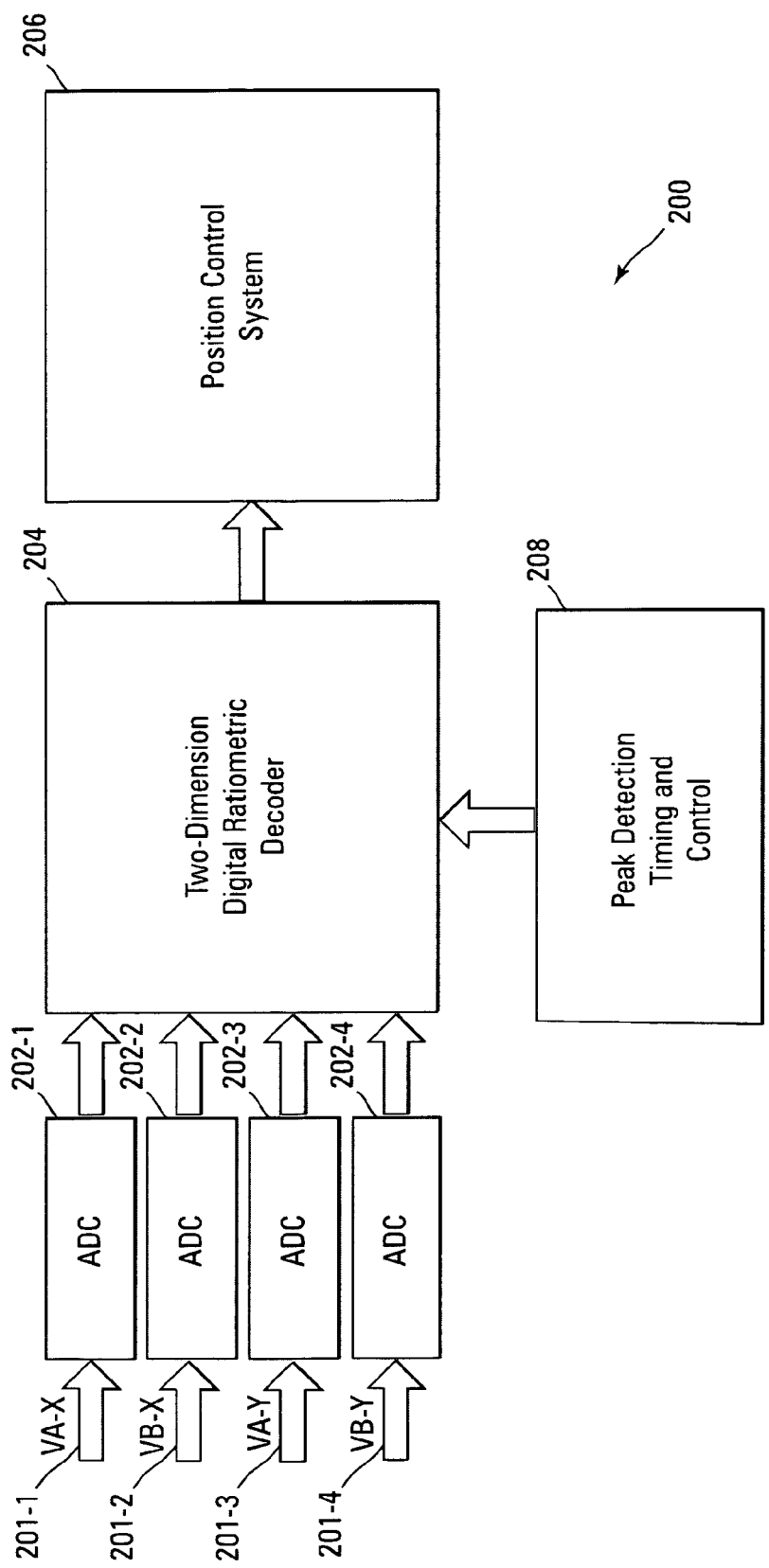
FIG. 2 is a block diagram of one embodiment of a closed loop control system implementing an embodiment of a two-dimension digital ratiometric decoder constructed according to the teaching of the present invention.

An embodiment of a servo control system 200 implementing a two-dimensional digital ratiometric decoder of one embodiment of the present invention is illustrated in FIG. 2. In this embodiment, four analog AC signals 201-1 through 201-4 (which are representative of a change in the X and Y dimensions of the physical position being measured) are passed into at least one analog-to-digital converter (ADC) 202-1 through 202-4. These digital signals then pass into the two-dimensional digital ratiometric decoder 204. The two-dimensional digital decoder 204 processes the signals as described above. A peak detect 208 is used to maximize the signal-to-noise ratio after the signals pass through the LPF in the two-dimensional ratiometric decoder as described above. The calculated quotient from the decoder 204 is then passed back to a control system 206, also referred to as a control unit 206, for use in controlling the position of the object under control.

Figure 3:
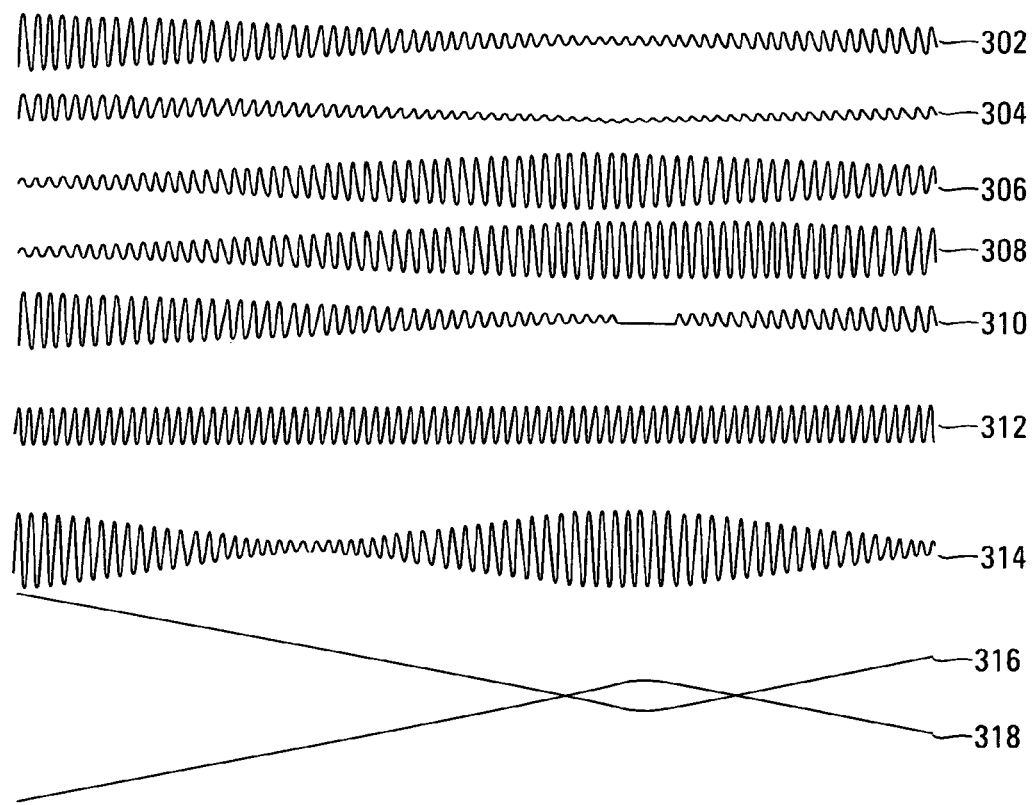
FIG. 3 is a signal diagram of sinusoidal wave signals which are representative of the signals received, processed and outputted by a two-dimension digital ratiometric decoder of one embodiment of the present invention.

A signal diagram 300 of sample signals which are representative of the signals received, processed and outputted by a two-dimensional ratiometric decoder of one embodiment of the present invention are illustrated in FIG. 3. Signals 302, 306, 308 and 310 are representative of the AC voltage signals of the four different signals (two for each dimension) before being rectified. Signal 304 is representative of those signals after being rectified. Signal 312 is representative of the sums of two signals in the same dimension. Signal 314 is representative of the difference of two signals in the same dimension. Quotients 316 and 318 are representative of the output quotients of the two-dimensional ratiometric decoder of the present invention where 316 is proportional to the change in the X dimension and 318 is proportional to the change in Y dimension. The actual movement of the object in this sample was diagonal.

Figure 4:
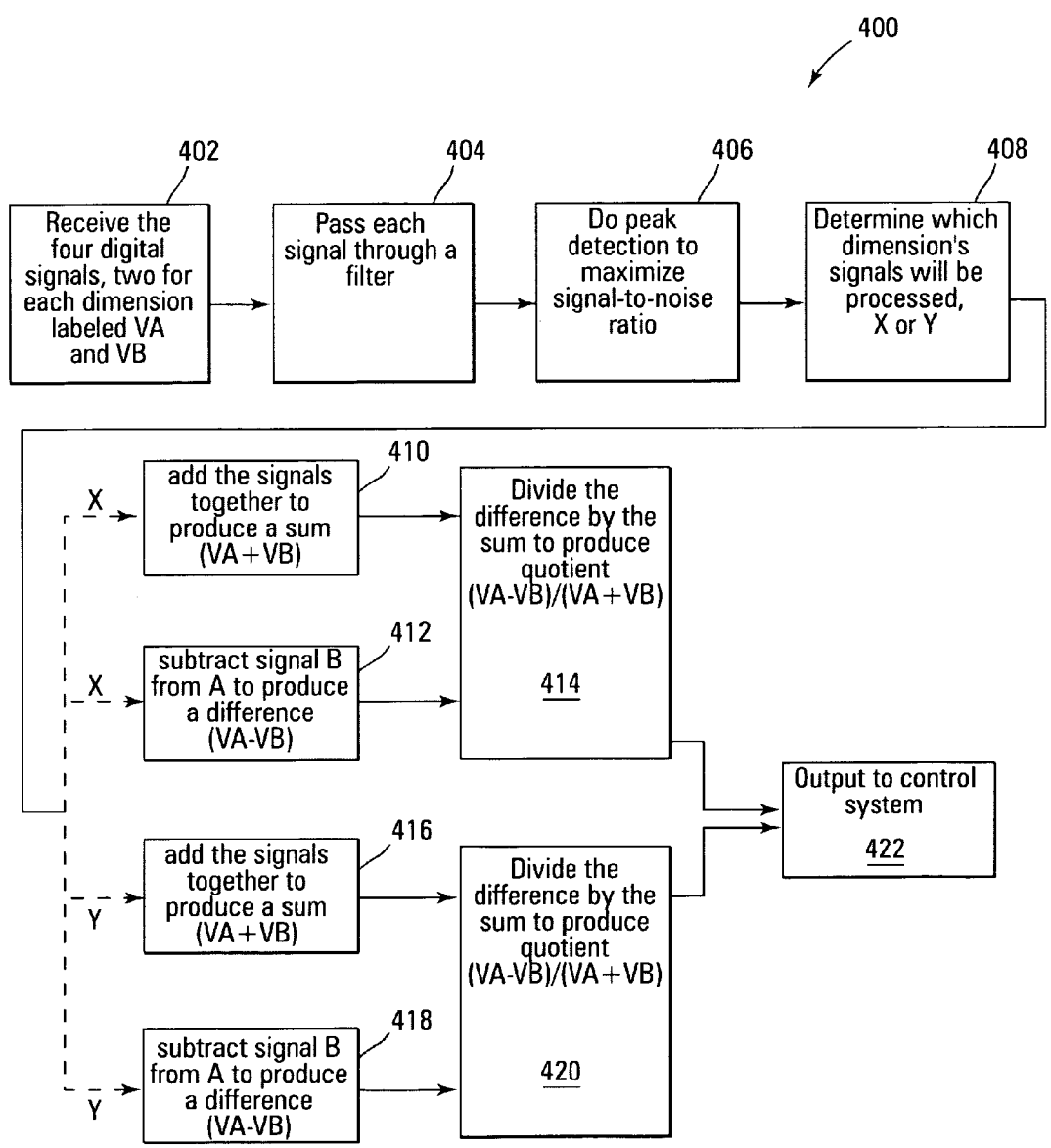
FIG. 4 is a flow diagram of one method employed by a two-dimension digital ratiometric decoder of one embodiment of the present invention.

A flow diagram 400 illustrating the process of the two-dimensional digital ratiometric decoder of one embodiment of the present invention is shown in FIG. 4. As shown, the process starts by receiving four digital signals (402). There are two signals for each dimension. The two signals are labeled for convenience as VA and VB for each dimension. Each of these signals is then passed through a filter to smooth out the signal and reduce noise (404). At this point, peak detection is performed on each of the signals in order to maximize the signal-to-noise ratio (406). Then the signals pass to a selector circuit which determines which dimension will be processed (408). The circuit does this in a time share fashion, picking one dimension and then the other. The signals representative of the dimension selected are then passed to the summation and subtraction circuits (410), (416); (412), (418). The outputs of the summation and subtraction circuits are then passed to a divider circuit which produces a quotient of (VA−VB)/(VA+VB) (414), (420). The value of this quotient is proportional to the change in position of the actual object under control. This quotient is then output to the control system (422).

The two-dimensional digital ratiometric decoder as described in the present application has the following advantages over the existing analog circuits. First, it does not suffer from component drift as the current analog circuits do. Second, it is temperature independent. Third, it is not subject to the requirement that the sum (VA+VB) be constant. It only requires that the ratio of the incoming signals be representative of the position of the object being observed. Fourth, it operates in two dimensions where the current analog counterparts function only in one direction. Lastly, since it is digital, it will interface directly with the digital signal processors of today's closed loop control systems. Therefore, the two-dimensional digital ratiometric decoder solves the need in the art for a decoder which is not subject to the limitations of the analog circuits and operates in more than one dimension.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A closed loop control system, comprising:
    one or more analog-to-digital converters (ADC) adapted to convert analog signals representative of a change in X and Y dimensions into digital signals;
    a two-dimensional digital ratiometric decoder adapted to process the digital signals into a digital value representative of a position offset with respect to a center point; and
    a control unit adapted to process an output of the two-dimensional digital ratiometric decoder.

2. The closed loop control system of claim 1, wherein the two-dimensional digital ratiometric decoder is implemented in an integrated circuit where the ADC converters are integrated with the signal-processing core.

3. The closed loop control system of claim 1, wherein the closed loop control system is a servo control system used for controlling position and velocity.

4. The closed loop control system of claim 1, wherein the digital signals output by the ADC converters are over-sampled 16-bit amplitude modulated signals.

5. The closed loop control system of claim 1, wherein the two-dimensional digital ratiometric decoder comprises:
    at least one selector adapted to select the signals to be processed by alternating between the signals representative of the X dimension and the signals representative of the Y dimension;
    a summation circuit adapted to add the amplitude magnitudes of the signals selected by the selector circuit;
    a difference circuit adapted to obtain the difference between the amplitude magnitudes of the signals selected by the selector circuit; and
    a divider circuit adapted to divide the output of the difference circuit by the output of the summation circuit to produce a quotient proportional to the physical change of the object being controlled.

6. The closed loop control system of claim 5 wherein one of the signals representative of the X and Y dimensions is static enabling the two-dimensional digital ratiometric decoder to function in only one dimension.

7. The closed loop control system of claim 5 wherein the two-dimensional digital ratiometric decoder is programmed to process the signals of only one dimension.

8. The closed loop control system of claim 5 wherein the two-dimensional digital ratiometric decoder further comprises one or more rectifiers adapted to convert an alternating current (AC) signal into a direct current (DC) signal.

9. The closed loop control system of claim 5 wherein the two-dimensional digital ratiometric decoder further comprises a peak detection circuit adapted to detect peak amplitudes and maximize a signal-to-noise ratio.

10. The closed loop control system of claim 5 wherein the at least one selector circuit is a 2-to-1 multiplexor.

11. The closed loop control system of claim 5 wherein the at least one selector circuit further comprises two selector circuits.

12. The closed loop control system of claim 5 wherein the output quotient of the divider circuit is a 16-bit quotient.

13. The closed loop control system of claim 5 wherein the two-dimensional digital ratiometric decoder further comprises one or more filters adapted to reduce noise and smooth out signals representative of a change in the X and Y dimensions.

14. The closed loop control system of claim 13 wherein the one or more filters further comprises four filters.

15. The closed loop control system of claim 13 wherein the one or more filters are two-pole infinite impulse response low pass filters with programmable coefficients.

16. The closed loop control system of claim 15 wherein the one or more two-pole infinite impulse response low pass filters are implemented using a bit-serial approach.

17. The closed loop control system of claim 13 wherein the one or more filters is further adapted to decimate the digital signals representative of a change in the X and Y dimensions.

18. The closed loop control system of claim 17 wherein the decimation factor is 18.

19. A method for processing digital signals such that the resultant digital signal is proportional to a physical change detected in a closed loop control system, comprising:
    adding two digital signals for one dimension to produce a sum of the signals' magnitudes;
    subtracting one of the signals from the other to produce a difference of the signals' magnitudes; and
    dividing the difference of the signals' magnitudes by the sum of the signals' magnitudes to produce a quotient which is proportional to the physical change of an object being controlled.

20. The method of claim 19, further comprising:
    rectifying the two digital signals.

21. The method of claim 19 wherein the output quotient is a 16-bit quotient.

22. The method of claim 19 further comprising:
    filtering the two digital signals to reduce noise and smooth out the signals.

23. The method of claim 22, further comprising:
detecting peak amplitudes after filtering the signals to maximize a signal-to-noise ratio.

24. The method of claim 22 wherein filtering the two digital signals further comprises:
decimating the digital signals.

25. The method of claim 24 wherein the decimation factor is 18.

26. The method of claim 19, further comprising:
receiving four digital signals, wherein the ratio of two of the said signals is representative of a physical change in the x dimension and the ratio of the remaining two signals is representative of a physical change in the y dimension.

27. The method of claim 26, further comprising:
rectifying the four digital signals.

28. The method of claim 26, further comprising:
alternating between performing the processes of adding, subtracting and dividing for the X dimension with performing the processes of adding, subtracting and dividing for the Y dimension in a time share fashion.

29. The method of claim 26, further comprising: filtering the four digital signals to reduce noise and smooth out the signals.

30. The method of claim 29, further comprising:
detecting peak amplitudes after filtering the signals to maximize a signal-to-noise ratio.

31. The method of claim 29 wherein filtering the four digital signals further comprises:
decimating the digital signals.

32. The method of claim 31 wherein the decimation factor is 18.

33. A two-dimensional digital ratiometric decoder comprising:
at least one selector circuit connected to the output of the one or more filters adapted to select the signals to be processed by alternating between the signals representative of the X dimension and the signals representative of the Y dimension;
a summation circuit adapted to add the amplitude magnitudes of the signals selected by the selector circuit;
a difference circuit adapted to obtain the difference between the amplitude magnitudes of the signals selected by the selector circuit; and
a divider circuit adapted to divide the output of the difference circuit by the output of the summation circuit to produce a quotient proportional to the physical change of an object being controlled.

34. The closed loop control system of claim 33 wherein one of the signals representative of the X and Y dimensions is static enabling the two-dimensional digital ratiometric decoder to function in only one dimension.

35. The closed loop control system of claim 33 wherein the two-dimensional digital ratiometric decoder is programmed to process the signals of only one dimension.

36. The two-dimensional digital ratiometric decoder of claim 33 further comprising: one or more rectifiers adapted to convert an alternating current (AC) signal into a direct current (DC) signal.

37. The two-dimensional digital ratiometric decoder of claim 33 wherein the at least one selector circuit is a 2-to-1 multiplexor.

38. The two-dimensional digital ratiometric decoder of claim 33 wherein the at least one selector circuit further comprises two selector circuits.

39. The two-dimensional digital ratiometric decoder of claim 33 wherein the output quotient of the divider circuit is a 16-bit quotient.

40. The two-dimensional digital ratiometric decoder of claim 33 wherein the signals representative of a change in the X and Y dimensions are over-sampled 16-bit digitized amplitude modulated signals.

41. The two-dimensional digital ratiometric decoder of claim 33 wherein the two-dimensional digital ratiometric decoder is implemented in an integrated circuit where ADC converters are integrated with the signal-processing core.

42. The two-dimensional digital ratiometric decoder of claim 33 further comprising:
a peak detection circuit adapted to detect peak amplitudes and maximize a signal-to-noise ratio.

43. The two-dimensional digital ratiometric decoder of claim 33 further comprising:
one or more filters adapted to reduce noise and smooth out digital signals representative of a change in the x and y dimensions.

44. The two-dimensional digital ratiometric decoder of claim 43 wherein the one or more filters further comprises four filters.

45. The two-dimensional digital ratiometric decoder of claim 43 wherein the one or more filters are two-pole infinite response low pass filters with programmable coefficients.

46. The two-dimensional digital ratiometric decoder of claim 45 wherein the one or more two-pole infinite response low pass filters are implemented using a bit-serial approach.

47. The two-dimensional digital ratiometric decoder of claim 43 wherein the one or more filters are further adapted to decimate the digital signals.

48. The two-dimensional digital ratiometric decoder of claim 47 wherein the decimation factor is 18.

49. A method for responding to a physical change in a closed loop control system comprising:
converting analog signals to digital signals, wherein the analog signals are representative of a physical change in more than one dimension;
processing the converted digital signals with a two-dimensional digital ratiometric decoder to produce a digital quotient which is proportional to the physical change measured; and
processing the digital quotient to determine the appropriate response to the physical change measured.

50. The method of claim 49 wherein processing the converted digital signals in a two-dimensional digital ratiometric decoder further comprises:
adding two digital signals for one dimension to produce a sum of the signals' magnitudes;
subtracting one of the signals from the other to produce a difference of the signals' magnitudes; and
dividing the difference of the signals' magnitudes by the sum of the signals' magnitudes to produce a quotient which is proportional to the physical change of the object being controlled.

51. The method of claim 50 wherein the output quotient is a 16-bit quotient.

52. The method of claim 50, further comprising:
rectifying the two digital signals.

53. The method of claim 50 further comprising:
filtering the two digital signals to reduce noise and smooth out the signals.

54. The method of claim 53 further comprising:
detecting peak amplitudes after filtering the signals to maximize a signal-to-noise ratio.

55. The method of claim 53 wherein filtering the two digital signals further comprises:
decimating the digital signals.

56. The method of claim 55 wherein the decimation factor is 18.

57. The method of claim 50 further comprising:
receiving four digital signals, wherein the ratio of two of the said signals is representative of a physical change in the x dimension and the ratio of the remaining two signals is representative of a physical change in the y dimension.

58. The method of claim 57, further comprising:
rectifying the four digital signals.

59. The method of claim 57, further comprising:
alternating between performing the processes of adding, subtracting and dividing for the x dimension with performing the processes of adding, subtracting and dividing for the y dimension in a time share fashion.

60. The method of claim 57, further comprising:
filtering the four digital signals to reduce noise and smooth out the signals.

61. The method of claim 60, further comprising:
detecting peak amplitudes after filtering the signals to maximize a signal-to-noise ratio.

62. The method of claim 60 wherein filtering the four digital signals further comprises: decimating the digital signals.

63. The method of claim 62 wherein the decimation factor is 18.

* * * * *